(12) United States Patent
Kim et al.

(10) Patent No.: US 11,524,413 B2
(45) Date of Patent: Dec. 13, 2022

(54) EMERGENCY STOP OF ROBOT

(71) Applicant: LG ELECTRONICS INC, Seoul (KR)

(72) Inventors: Sunuk Kim, Seoul (KR); Hokyung Ka, Seoul (KR); Jongkwon Yi, Seoul (KR); Chunho Cho, Seoul (KR); Byunghyuk Lee, Seoul (KR); Keunsik No, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 16/875,260

(22) Filed: May 15, 2020

(65) Prior Publication Data

US 2021/0162604 A1 Jun. 3, 2021

(30) Foreign Application Priority Data

Nov. 29, 2019 (KR) .......................... 10-2019-0157027

(51) Int. Cl.
*B25J 13/06* (2006.01)
*B25J 9/16* (2006.01)

(52) U.S. Cl.
CPC ............. *B25J 13/06* (2013.01); *B25J 9/1661* (2013.01)

(58) Field of Classification Search
CPC ........ B25J 13/06; B25J 9/1661; B25J 9/1674; B25J 11/0005; B25J 9/101; B25J 9/126; B25J 9/161; G05B 19/042; G05B 2219/40202
See application file for complete search history.

(56) References Cited

U.S. PATENT DOCUMENTS

| | | | |
|---|---|---|---|
| 11,370,108 B2* | 6/2022 | Greenberg | A01G 9/143 |
| 2016/0320777 A1* | 11/2016 | Yun | G05D 1/0238 |
| 2017/0019701 A1* | 1/2017 | Kim | H04N 21/4435 |
| 2017/0225331 A1* | 8/2017 | Sussman | B25J 9/1676 |
| 2017/0261962 A1* | 9/2017 | Naitou | G05B 19/048 |
| 2020/0073401 A1* | 3/2020 | Szatmary | G05D 1/0077 |
| 2021/0321854 A1* | 10/2021 | Zhang | B25J 9/0003 |

* cited by examiner

*Primary Examiner* — Kira Nguyen
(74) *Attorney, Agent, or Firm* — KED & Associates LLP

(57) ABSTRACT

A robot may perform emergency stopping. The robot includes: a driving device configured to perform movement of the robot; a stop switch configured to output a stop switch signal; a controller configured to output a stop signal; and a stop circuit configured to output a first control signal and a second control signal for stopping the driving device. The stop circuit may output the first control signal and the second control signal in response to the stop signal and the stop switch signal.

17 Claims, 8 Drawing Sheets

EMERGENCY STOP OF ROBOT

CROSS-REFERENCE TO RELATED APPLICATION

This application claims priority under 35 U.S.C. § 119 to Korean Application No. 10-2019-0157027 filed on Nov. 29, 2019, whose entire disclosure is hereby incorporated by reference.

BACKGROUND

1. Field

Embodiments of the present disclosure relate to a robot capable of performing emergency stopping.

2. Background

Generally, a robot is a machine capable of automatically carrying out or performing a given operation by its own ability, and the robot is variably used in the industrial field, medical field, household, military field, marine field, etc. Recently, a communication type robot capable of performing communication or interaction with persons through voice or gesture has been increased. In the meantime, when an emergency situation occurs during interaction between a robot and a person, the robot needs to stop quickly for the safety of the person.

BRIEF DESCRIPTION OF THE DRAWINGS

The embodiments will be described in detail with reference to the following drawings in which like reference numerals refer to like elements and wherein.

DETAILED DESCRIPTION

Figure 1:
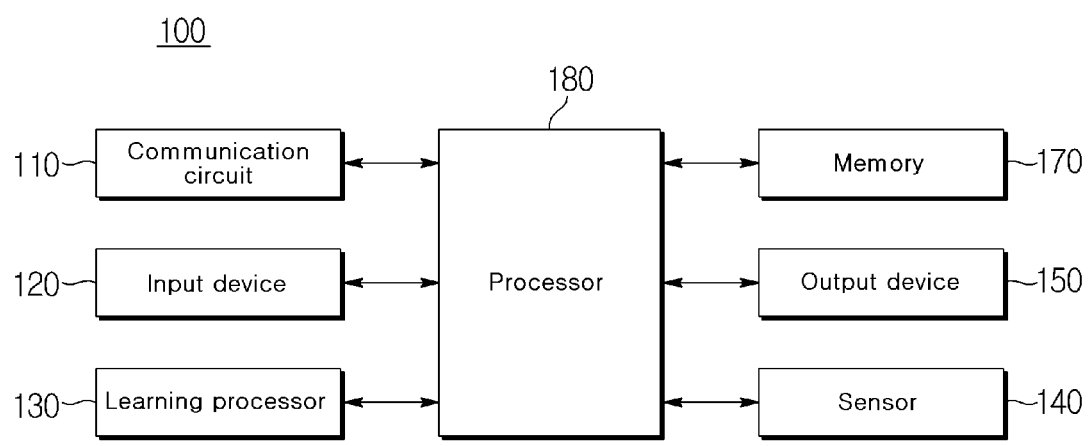
FIG. 1 is a view showing an AI apparatus according to an embodiment of the present disclosure.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

The artificial neural network may include an input layer, an output layer, and at least one selective hidden layer. Each layer may include at least one neuron, and the artificial neural network may include a synapse that connects neurons. In the artificial neural network, each neuron may output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method. Supervised learning may mean a method of performing learning for an artificial neural network where a label related to learning data is provided, and the label may mean a right answer (or result value) that has to be estimated by the artificial neural network when the learning data is input to the artificial neural network. Unsupervised learning may mean a method of performing learning for an artificial neural network where a label related to learning data is not provided. Reinforcement learning may mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot may be a machine capable of automatically carrying out or operating a given operation by its own ability. Particularly, a robot having a function of recognizing an environment, and performing an operation by performing determination by itself may be referred to as an intelligent robot. A robot may be classified into an industrial type, a medical type, a household type, a military type, etc. according to the usage purpose or field.

The robot may be provided with a manipulator including an actuator or a driving device so that the robot may perform various physical operations such as moving a robot joint, and so on. In addition, a movable robot may navigate on the ground or fly in the air by including wheels, brakes and propellers, etc.

Self-driving means the technology of autonomous driving, and a self-driving vehicle means a vehicle that drives without user's manipulations or with the minimum manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, etc.

Vehicles may include a vehicle with only an internal combustion engine, a hybrid vehicle with an internal combustion engine and an electric motor together, and an electric vehicle with only an electric motor, and may include automobiles as well as trains and motorcycles. Herein, a self-driving vehicle may be referred to as a robot with a self-driving function.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used. The XR technique may be applied by using a head-mount display (HMD), a head-up display (HUD), a mobile phone, a tablet PC, a laptop PC, a desktop PC, a TV, a digital signage, etc., and a device to which the XR technique is applied may be referred to an XR device.

FIG. 1 is a view showing an AI apparatus 100 according to an embodiment of the present disclosure. The AI apparatus 100 may be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc. The AI apparatus 100 may include a communication circuit 110, an input device 120, a learning processor 130, a sensor 140, an output device 150, a memory 170, and a processor 180.

The communication circuit 110 may transmit and receive data to/from another AI apparatuses (100a to 100e) or external devices such as an AI server 200 by using wired/wireless communication methods. For example, the communication circuit 110 may transmit and receive sensor information, user input, learning model, control signals, etc. to/from external devices. Herein, communication methods used by the communication circuit 110 include global system for mobile communication (GSM)), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), etc.

The input device 120 may be for obtaining various types of data. Herein, the input device 120 may include a camera for an image signal input, a microphone for receiving audio signals, and a user input part for receiving information from the user. Herein, signals obtained from the camera or microphone by using the same as sensors may be referred to as sensing data or sensor information. The input device 120 may be for obtaining input data used for outputting that is performed by using learning data and a learning model for model learning. The input device 120 may be for obtaining input data that is not processed. Herein, the processor 180 or learning processor 130 may obtain an input feature from input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as a reference for performing a certain operation. Herein, the learning processor 130 may perform AI processing with a learning processor 240 of the AI server 200. Herein, the learning processor 130 may be integrated in the AI apparatus 100 or may include a memory employed therein. Alternatively, the learning processor 130 may be employed by using the memory 170, an external memory directly connected to the AI apparatus 100, or a memory maintained in an external device.

The sensor 140 may obtain at least one among internal information of the AI apparatus 100, surrounding environmental information of the AI apparatus 100, and user information by using various sensors. Herein, the sensor 140 may include a proximity sensor, an ambient light sensor, an acceleration sensor, a magnetic sensor, a gyro sensor, an inertial sensor, an RGB sensor, an IR sensor, a fingerprint recognizing sensor, a ultrasonic sensor, an optical sensor, a microphone, a lidar, a radar, etc.

The output device 150 may generate an output related to visual, auditory, or tactile. Herein, the output device 150 may include a display for visually outputting information, a speaker for acoustically outputting information, and a haptic actuator for tactually outputting information. For example, the display may output an image or video, the speaker may output a voice or sound, and the haptic actuator may output vibration.

The memory 170 may be for storing data supporting various functions of the AI apparatus 100. For example, in the memory 170, input data obtained through the input device 120, learning data, a learning model, a learning history, etc. may be stored.

The processor 180 may determine at least one executable operation of the AI apparatus 100 which is determined on the basis of information determined or generated by using a data analysis algorithm or machine learning algorithm. In addition, the processor 180 may perform the determined operation by controlling components of the AI apparatus 100. For the same, the processor 180 may make a request, retrieve, receive, or use data of the learning processor 130 or the memory 170, and control components of the AI apparatus 100 so as to perform the estimated operation of the at least one executable operation, or an operation that is determined to be desirable. In order to perform the determined operation, the processor 180 may generate, when association with an external device is required, a control signal for controlling the corresponding external device, and transmit the generated control signal to the corresponding external device.

The processor 180 may obtain intention information on the user's input, and determine a user's requirement on the basis of the obtained intention information. The processor 180 may obtain intention information in association with the user's input by using at least one among a STT (speech-to-text) engine converting a voice input into text strings, and a natural language processing (NLP) engine obtaining intention information of natural language.

A part of the at least one among the STT engine and the NLP engine may be configured with an artificial neural network for which learning is performed according to a machine learning algorithm. In addition, for at least one among the STT engine and the NLP engine, learning may be performed by the learning processor 130, learning may be performed by the learning processor 240 of the AI server 200, or learning may be performed through distribution processing of the above processors.

The processor 180 may collect record information including operation content of the AI apparatus 100 and user's feedback in association with the operation, etc. so as to store in the memory 170 or the learning processor 130, or transmit the information to the external device such as an AI server 200, etc. The collected record information may be used when updating a learning model.

The processor 180 may control a part of components of the AI apparatus 100 so as to execute application programs stored in the memory 170. Further, the processor 180 may operate components of the AI apparatus 100 by combining at least two thereof so as to execute the application programs.

Figure 2:
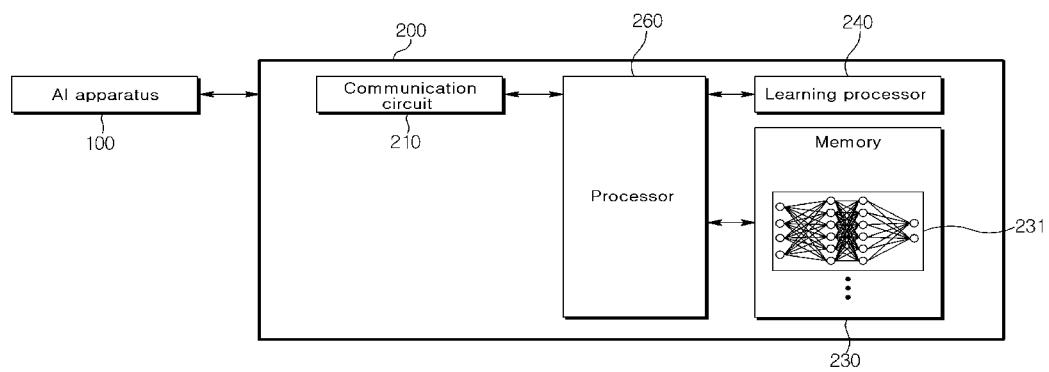
FIG. 2 is a view showing an AI server according to an embodiment of the present disclosure.

FIG. 2 is a view showing an AI server 200 according to an embodiment of the present disclosure. The AI server 200 may mean a device performing learning for an artificial neural network by using a machine learning algorithm, or a device using the artificial neural network for which learning is performed. The AI server 200 may perform distributed processing by being configured with a plurality of servers, or may be defined as a 5G network. The AI server 200 may perform at least a part of AI processing by being included as a partial component of the AI apparatus 100. The AI server 200 may perform at least a part of AI processing by being included as a partial component of the AI apparatus 100.

The communication circuit 210 may transmit and receive data to/from the external devices such as AI apparatus 100, etc. The memory 230 may be for storing a model (or artificial neural network, 231) for which learning is ongoing or performed by the learning processor 240. The learning processor 240 may perform learning for an artificial neural network 231 by using learning data. A learning model may be used by being integrated in the AI server 200 of the artificial neural network, or by being integrated in the external device such as an AI apparatus 100, etc. The learning model may be employed in hardware, software, or combination thereof. When a part or the entire of the learning model is employed in software, at least one instruction constituting the learning model may be stored in the memory 230.

The processor 260 may estimate a result value for new input data by using the learning model, and generate a response or control command on the basis of the estimated result value.

Figure 3:
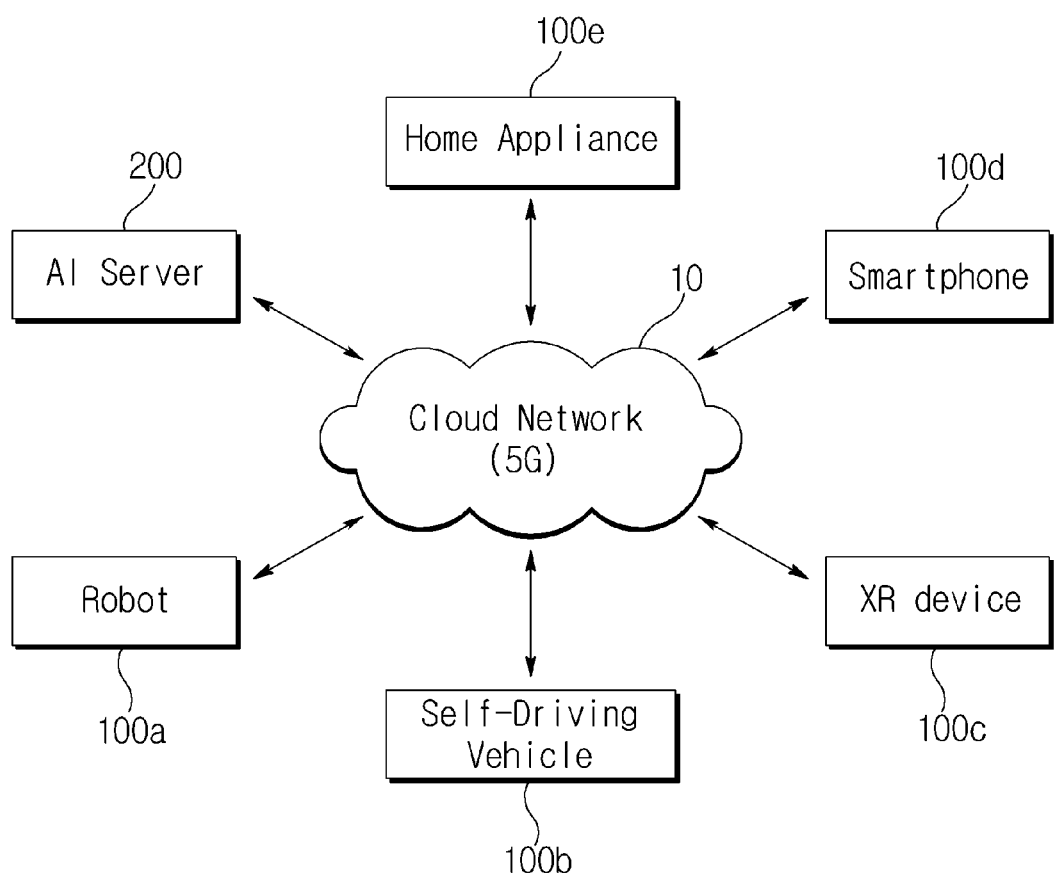
FIG. 3 is a view showing an AI system according to an embodiment of the present disclosure.

FIG. 3 is a view showing an AI system 1 according to an embodiment of the present disclosure. The AI system 1 is connected to at least one cloud network 10 among the AI server 200, a robot 100a, self-driving vehicle 100b, an XR device 100c, a smart phone 100d, and a home appliance 100e. Herein, the robot 100a, the self-driving vehicle 100b, the XR device 100c, the smart phone 100d or the home appliance 100e to which the AI technique is applied may be referred to as the AI apparatus (100a to 100e).

The cloud network 10 may mean a network constituting a part of cloud computing infrastructure or a network present in the cloud computing infrastructure. The cloud network 10 may be configured by using a 3G network, a 4G or LTE network, a 5G network, etc.

In other words, each device (100a to 100e, 200) constituting the AI system 1 may be connected with each other through the cloud network 10. Particularly, each device (100a to 100e, 200) may perform communication with each other through a base station, and also may perform direct communication without using the base station.

The AI server 200 may include a server performing AI processing, and a server performing calculation for big data. The AI server 200 may be connected to at least one of AI apparatus constituting an AI system 1 configured with the robot 100a, the self-driving vehicle 100b, the XR device 100c, the smart phone 100d, and the home appliance 100e through the cloud network 10, and the AI server 200 may support a part of the AI processing of the connected AI apparatuses (100a to 100e).

The AI server 200 may perform learning on an artificial neural network according to a machine learning algorithm in place of the AI apparatus (100a to 100e), may directly store a learning model, or transmit the learning model to the AI apparatus (100a to 100e).

The AI server 200 may receive input data from the AI apparatus (100a to 100e), estimate a result value for the received input data by using a learning model, and generate a response or control command on the basis of the estimated result value so as to transmit the same to the AI apparatus (100a to 100e). Alternatively, the AI apparatus (100a to 100e) may estimate a result value for the received input data by directly using a learning model, and generate a response or control command on the basis of the estimated result value.

Hereinafter, various examples of the AI apparatus (100a to 100e) to which the above described technique is applied will be described. The AI apparatus (100a to 100e) shown in FIG. 3 may be referred to a detailed example of the AI apparatus 100 shown in FIG. 1.

The robot 100a may be employed as a guide robot, a transport robot, a cleaning robot, a wearable robot, an entertainment robot, a pet robot, an unmanned flying robot, etc. by applying the AI technique thereto.

The robot 100a may include a robot control module for controlling operations, and the robot control module may mean a software module or a chip where the same is employed therein. The robot 100a may obtain state information of the robot 100a, detect (recognize) a surrounding environment or objects, generate map data, determine a moving path or driving plan, determine a response in association with a user interaction, or determine operations by using sensor information that is obtained through various types of sensors. In order to determine a moving path or driving plan, the robot 100a may use sensor information obtained by using at least one sensor of a lidar, a radar, and a camera.

The robot 100a may perform the above operations by using a learning model configured with at least one artificial neural network. For example, the robot 100a may recognize a surrounding environment and objects by using a learning model, and determine operations by using the recognized surrounding environment information or object information. The learning model may be obtained by directly performing learning by the robot 100a, or by performing learning by the external device such as an AI server 200, etc.

The robot 100a may generate a result by directly using the learning model so as to perform operations. However, the robot 100a may transmit the sensor information to the external device such as an AI server 200, and receive a result generated according thereto so as to perform operations.

The robot 100a may determine a moving path and a driving plan by using at least one among map data, object information detected from the sensor information, and object information obtained from the external device, and drive according to the determined moving path and the driving plan by controlling a driving part. Map data may include object identification information on various objects arranged in a space where the robot 100a moves. For example, the map data may include object identification information on fixed objects such as walls, doors, etc., and movable objects such as flowerpots, tables, etc. In addition, the object identification information may include a name, a type, a distance, a position, etc.

In addition, the robot 100a may perform operations or drive by controlling the driving part on the basis of the user's control/interaction. The robot 100a may obtain intention information on interaction according to a user's behavior or voice input, and determine a response on the basis of the obtained intention information so as to perform operations.

The self-driving vehicle 100b may be employed as a movable robot, a vehicle, an unmanned flying robot, etc. by applying the AI technique thereto. The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors. In order to determine a moving path or driving plan, the self-driving vehicle 100b, similar to the robot 100a, may use sensor information obtained by using at least one sensor of a lidar, a radar, and a camera. Particularly, the self-driving vehicle 100b may recognize an environment and objects for areas that are hidden from view or over a certain distance by receiving sensor information from external devices, or by receiving information directly recognized from the external devices.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external device such as an AI server 200, etc.

The self-driving vehicle 100b may generate a result by directly using the learning model so as to perform operations. However, the self-driving vehicle 100b may transmit the sensor information to the external device such as an AI server 200, and receive a result generated according thereto so as to perform operations.

The self-driving vehicle 100b may determine a moving path and a driving plan by using at least one among map data, object information detected from the sensor information, and object information obtained from the external device, and drive according to the determined moving path and the driving plan by controlling a driving part. Map data may include object identification information on various objects (for example, roads) arranged in a space where the self-driving vehicle 100b drives. For example, the map data may include object identification information on fixed objects such as street lamps, rocks, buildings, etc. and movable objects such as vehicles, pedestrians, etc. In addition, the object identification information may include a name, a type, a distance, a position, etc.

In addition, the self-driving vehicle 100b may perform operations or drive by controlling the driving part on the basis of the user's control/interaction. The self-driving vehicle 100b may obtain intention information on interaction according to a user's behavior or voice input, and determine a response on the basis of the obtained intention information so as to perform operations.

The XR device 100c may be employed by using a HMD, a HUD provided in a vehicle, a TV, a mobile phone, a smart phone, a PC, a wearable device, a home appliance, a digital signage, a vehicle, or a fixed type robot or movable type robot. The XR device 100c analyze 3D point cloud data or image data which is obtained through various sensors or external devices, generate position data and feature data on 3D points, and obtain information on a surrounding space and real objects and output XR objects to be rendered. For example, the XR device 100c may output XR objects including additional information on the recognized objects by reflecting the same in the corresponding recognized objects.

The XR device 100c may perform the above operations by using a learning model configured with at least one artificial neural network. For example, the XR device 100c may recognize real objects from 3D point cloud data or image data by using a learning model, and provide information in association with the recognized real objects. The learning model may be obtained by directly performing learning by the XR device 100c, or by performing learning by the external device such as an AI server 200, etc. The XR device 100c may generate a result by directly using the learning model so as to perform operations. However, the XR device 100c may transmit the sensor information to the external device such as an AI server 200, and receive a result generated according thereto so as to perform operations.

The robot 100a may be employed as a guide robot, a transport robot, a cleaning robot, a wearable robot, an entertainment robot, a pet robot, an unmanned flying robot, etc. by applying the AI technique and the self-driving technique thereto. The robot 100a to which the AI technique and the self-driving technique are applied may mean a robot itself with a self-driving function, or the robot 100a operating in conjunction with the self-driving vehicle 100b. The robot 100a with the self-driving function may refer to all devices moving by itself according to a given movement, or by determining a moving path by itself without a user control.

The robot 100a and the self-driving vehicle 100b which respectively have self-driving functions may use a common sensing method for determining at least one among a moving path and a driving plan. For example, the robot 100a and the self-driving vehicle 100b which respectively have self-driving functions may determine a moving path or driving plan by using information sensed through a lidar, a radar, a camera, etc.

The robot 100a operating in conjunction with the self-driving vehicle 100b may be present separate from the self-driving vehicle 100b, while the robot 100a is internally or externally connected to the self-driving function of the self-driving vehicle 100b, or may perform operations in association with the driver of the self-driving vehicle 100b.

The robot 100a operating in conjunction with the self-driving vehicle 100b may obtain sensor information in place of the self-driving vehicle 100b so as to provide the information to the self-driving vehicle 100b, or obtain sensor information and generate surrounding environment information or object information so as to provide the information to the self-driving vehicle 100*b*, and thus control or supplement the self-driving function of the self-driving vehicle 100*b*.

Alternatively, the robot 100*a* operating in conjunction with the self-driving vehicle 100*b* may monitor a driver of the self-driving vehicle 100*b*, or control functions of the self-driving vehicle 100*b* by operating in conjunction with the driver. For example, when it is determined that the driver is drowsy, the robot 100*a* may activate the self-driving function of the self-driving vehicle 100*b* or control the driving part of the self-driving vehicle 100*b*. Herein, functions of the self-driving vehicle 100*b* which are controlled by the robot 100*a* include, in addition to the self-driving function, functions provided from a navigation system or audio system provided in the self-driving vehicle 100*b*.

Alternatively, the robot 100*a* operating in conjunction with the self-driving vehicle 100*b* may provide information or supplement functions of the self-driving vehicle 100*b* from the outside of the self-driving vehicle 100*b*. For example, the robot 100*a* may provide traffic information including signal information such as smart signals to the self-driving vehicle 100*b*, or may automatically connect to an electrical charging device such as an automatic electric charger of an electric vehicle by operating in conjunction with the self-driving vehicle 100*b*.

The robot 100*a* may be employed as a guide robot, a transport robot, a cleaning robot, a wearable robot, an entertainment robot, a pet robot, an unmanned flying robot, a drone, etc. by applying the AI technique and the XR technique thereto. The robot 100*a* to which the XR technique is applied may mean a robot that becomes a target controlled/operated within an XR image. Herein, the robot 100*a* may be distinguished from the XR device 100*c* and operate in conjunction with the same.

For the robot 100*a* that becomes a target controlled/operated within an XR image, when sensor information is obtained from sensors including a camera, the robot 100*a* or the XR device 100*c* may generate an XR image on the basis of the sensor information, and the XR device 100*c* may output the generated XR image. In addition, the above robot 100*a* may operate on the basis of a control signal input through the XR device 100*c*, or in conjunction with the user. For example, the user may check an XR image in association with a view of the robot 100*a* that is in conjunction with the external device such as XR device 100*c* in a remote manner, adjust a self-driving path of the robot 100*a* through in conjunction with the robot 100*a*, control operations or driving, or check information on surrounding objects.

The self-driving vehicle 100*b* may be employed in (or as) a movable robot, a vehicle, an unmanned flying robot, etc. by applying the AI technique and the XR technique thereto. The self-driving vehicle 100*b* to which the XR technique is applied may mean self-driving vehicle provided with a device providing an XR image, and self-driving vehicle that becomes a target controlled/operated within an XR image, etc. Particularly, the self-driving vehicle 100*b* that becomes a target controlled/operated within an XR image may be distinguished from the XR device 100*c*, and operate in conjunction with the same.

The self-driving vehicle 100*b* provided with a device providing an XR image may obtain sensor information from sensors including a camera, and output an XR image generated on the basis of the obtained sensor information. For example, the self-driving vehicle 100*b* outputs an XR image by using a HUD, and thus provides to a passenger a real object or XR object in association with objects within a screen.

When the XR object is displayed on the HUD, at least a part of the XR object may be displayed to overlap the real object to which the passenger's eyes are directed. On the other hand, when the XR object displayed on a display included in the self-driving vehicle 100*b*, at least a part of the XR object may be displayed to overlap an object within the screen. For example, the self-driving vehicle 100*b* may output XR objects in association with carriageways, other vehicles, signals, traffic signs, motorcycles, pedestrians, buildings, etc.

For the self-driving vehicle 100*b* that becomes a target controlled/operated within an XR image, when sensor information is obtained from sensors including a camera, the self-driving vehicle 100*b* or XR device 100*c* may generate an XR image on the basis of the sensor information, and the XR device 100*c* may output the generated XR image. In addition, the above self-driving vehicle 100*b* may operate on the basis of a control signal input through the external device such as XR device 100*c*, etc. or in conjunction with the user.

Figure 4:
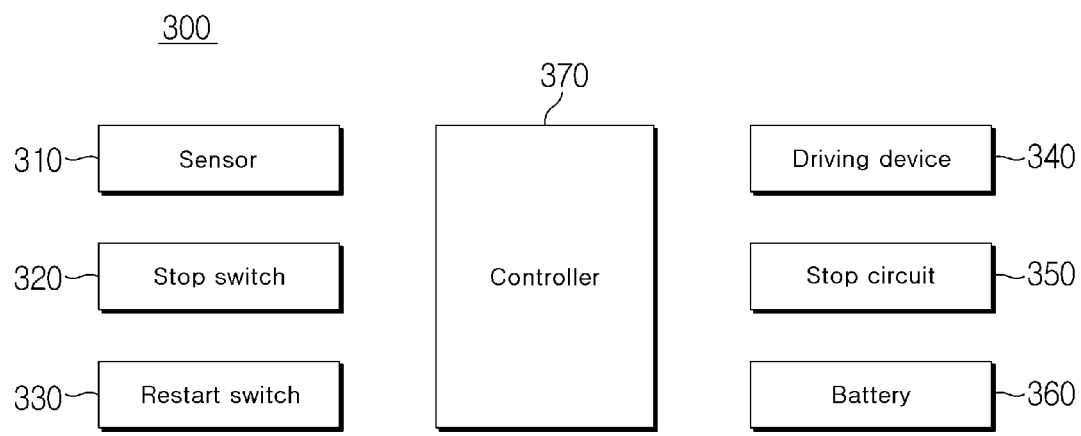
FIG. 4 is a view showing a robot according to embodiments of the present disclosure.

FIG. 4 is a view showing a robot according to an embodiment of the present disclosure. A robot 300 may include a sensor 310 (or sensor device), a stop switch 320 (or stop switch device), a restart switch 330 (or restart switch device), a driving device 340, a stop circuit 350, a battery 360, and a controller 370. The stop circuit 350 and the controller 370 may be collectively referred to as a stop control circuit (or stop control device).

As will be described below, the robot 300 according to embodiments of the present disclosure is capable of automatically stopping the driving device 340 when an emergency situation occurs, and the driving device 340 as well as the entire robot 300 may be stopped. For example, in the case where the robot 300 is a self-driving robot, when an emergency situation occurs, the robot 300 automatically stops driving. In addition, in the case where the robot 300 is a robot having a robotic arm, when an emergency situation occurs, operation of the robotic arm may be automatically stopped. In addition, the robot 300 may stop, considering the output of the stop switch 320 and further considering a result of detection by the sensor 310, and states of the processor 360 and the driving device 340, thereby enhancing stability of the robot 300.

The sensor 310 may detect the surrounding environment of the robot 300 and may generate information on the detected surrounding environment. The sensor 310 may include a camera, a lidar, a radar, an ultrasonic sensor, a proximity sensor, a limit sensor, an optical sensor, or the like, but it is not limited thereto. The sensor 310 may detect the surrounding environment of the robot 300 and may generate a detection value corresponding to a result of detection. The detection value may be stored in a memory included in the robot 300.

The stop switch 320 may be configured to output a stop switch signal. According to embodiments, the stop switch 320 may output the stop switch signal in response to being pressed. According to embodiments, the stop switch 320 may output the stop switch signal at a first level (for example, high level) for a predetermined time in response to the pressing of the stop switch 320. For example, the stop switch 320 may output the stop switch signal at the first level while the pressing of the stop switch is maintained.

The restart switch 330 may be configured to output a restart switch signal. According to embodiments, the restart switch 330 may output the restart switch signal in response to being pressed. According to embodiments, the restart switch 330 may output the restart switch signal at the first level (for example, high level) for a predetermined time in response to the pressing of the restart switch 330. For example, the restart switch 330 may output the restart switch signal at the first level (for example, high level) while the pressing of the restart switch 330 is maintained.

The driving device 340 may generate power for implementing the movement of the robot 300. According to embodiments, the driving device 340 may generate the power required to move the robot 300, to vibrate the robot 300, or to rotate the robot 300. For example, the driving device 340 may include a motor, an actuator, or a steering device, but it is not limited thereto. The driving device 340 may be a manipulator, such as a robotic arm, which is configured to perform mechanical operations, or a traveling device, such as a wheel, a belt, or a leg, which is configured to perform walking or driving of the robot 300, but it is not limited thereto.

The stop circuit 350 may output a control signal for stopping the movement of the robot 300. According to embodiments, the stop circuit 350 may output a control signal for stopping the movement of the driving device 340.

The battery 360 may supply power used in the robot 300. According to embodiments, the battery 360 may be charged with the power supplied from the outside, and may supply the power to each element of the robot 300. For example, the battery 360 may supply the power to the sensor 310, the stop switch 320, the restart switch 330, the driving device 340, the stop circuit 350, and the controller 370. For example, the battery 360 may be a secondary battery, but it is not limited thereto. The battery 360 may be any battery capable of being charged with power or discharged.

The controller 370 may be configured to control the overall operations of the robot 300. According to embodiments, the controller 370 may include a processor having a calculation processing function. For example, the controller 370 may include a circuit having a calculation processing function, such as a central processing unit (CPU), a micro controller unit (MCU), a graphics processing unit (GPU), an application specific integrated circuit (ASIC), or a field programmable gate array (FPGA), but it is not limited thereto.

The controller 370 may determine whether there is an object around the robot 300, by using sensor data generated by the sensor 310. According to embodiments, the controller 370 may set a safety region of the robot 300, and may determine, on the basis of the sensor data, whether there is an object within the safety region of the robot 300.

The controller 370 may monitor the pressing of the stop switch 320. According to embodiments, the controller 370 may receive the stop switch signal output from the stop switch 320, and may monitor outputting of the stop switch signal. The controller 370 may monitor the pressing of the restart switch 330. According to embodiments, the controller 370 may receive the restart switch signal output from the restart switch 330, and may monitor outputting of the restart switch signal.

The controller 370 may monitor the state of the driving device 340. According to embodiments, the controller 370 may monitor the temperature, the voltage, the current, the operation state of the driving device 340, and/or whether the driving device 340 starts/stops.

The controller 370 may generate a stop signal and may output the stop signal to the stop circuit 350. The generation and outputting of the stop signal may be described later.

In the meantime, in the present disclosure, the case where a first circuit receives a signal output from a second circuit includes the case where an amplification circuit or a buffer circuit is connected between the first circuit and the second circuit and the signal output from the second circuit is output to the first circuit through the amplification circuit or the buffer circuit. That is, in this specification, when there is amplification (or buffering) with no change in the role or function of a particular signal, the signals before and after the amplification are treated as substantially same signals.

Figure 5:
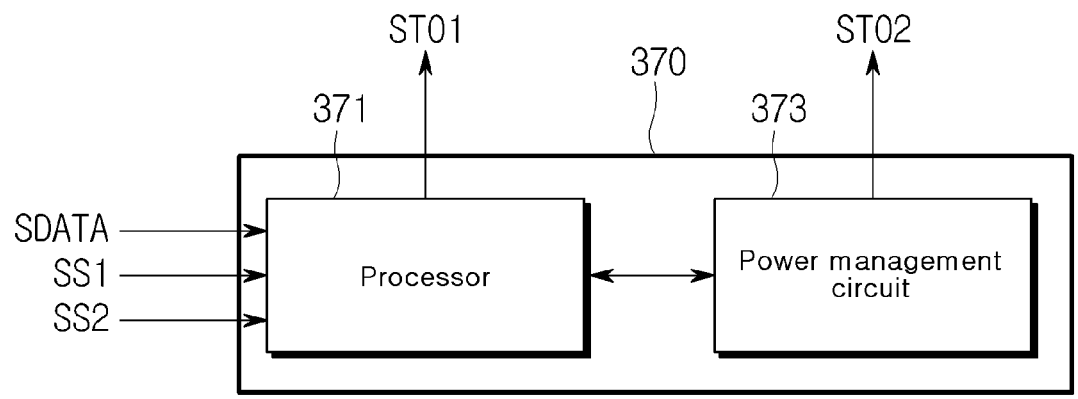
FIG. 5 is a view showing a controller according to embodiments of the present disclosure.

FIG. 5 is a view showing a controller according to embodiments of the present disclosure. The controller 370 may include a processor 371 and a power management circuit 373.

The processor 371 may control the overall operations of the robot 300. According to embodiments, the processor 371 may be a duplexing processor including at least two cores. That is, the processor 371 may include a first core, a second core, and a core control circuit. The core control circuit may activate and operate either the first core or the second core in response to a command from the outside. In addition, the core control circuit may monitor the states of the first core and the second core. According to embodiments, when the function of the processor 371 is performed, the core control circuit activates the first core and controls the first core so that the first core performs the function. Herein, when the first core does not operate normally, the core control circuit deactivates the first core and activates the second core instead. Afterward, the core control circuit may control the second core so that the activated second core performs the function continuously. Accordingly, malfunction of the processor 371 may be reduced. Particularly, the robot 300 of the present disclosure is a robot that is capable of automatically stopping (namely, emergency stopping) when a particular condition is satisfied. The duplexing processor according to embodiments of the present disclosure may be effective in implementing the stop function that is directly connected to the safety of the user.

The processor 371 may receive the sensor data SDATA generated by the sensor 310, the stop switch signal SS1 output from the stop switch 320, and the restart switch signal SS2 output from the restart switch 330. The processor 371 may generate a first stop signal STO1 and may output the first stop signal STO1 to the stop circuit 350. The stop circuit 350 may stop the operation of the driving device 340 in response to the first stop signal STO1.

The processor 371 may output the first stop signal STO1 on the basis of the sensor data SDATA. According to embodiments, the processor 371 may read the sensor data SDATA, and may output the first stop signal STO1 on the basis of the read sensor data SDATA. For example, the processor 371 may determine, by using the sensor data SDATA, whether an object is present in the predetermined safety region of the robot 300. When the object is present, the processor 371 outputs the first stop signal STO1.

The processor 371 may output the stop signal on the basis of the stop switch signal SS1. According to embodiments, when the stop switch signal SS1 at the first level (for example, high level) is received, the controller 370 outputs the first stop signal STO1 at the first level (for example, high level).

The processor 371 may maintain outputting of the first stop signal STO1. For example, the processor 371 may output the first stop signal STO1 at the first level, and may maintain the level of the first stop signal STO1 at the first level.

According to embodiments, once the first stop signal STO1 is output in response to the stop switch signal SS1, even though the stop switch signal SS1 is not received thereafter, the processor 371 may maintain outputting of the first stop signal STO1. In addition, once the first stop signal STO1 is output according to the determination using the sensor data SDATA, the processor 371 may maintain outputting of the first stop signal STO1.

The processor 371 may stop outputting of the first stop signal STO1 in response to the restart switch signal SS2. According to embodiments, when the first stop signal STO1 at the first level (for example, high level) is output, the processor 371 changes the level of the first stop signal STO1 to the second level (for example, low level) or stops outputting of the first stop signal STO1, in response to the restart switch signal SS2. In other words, the processor 371 may maintain outputting of the first stop signal STO1 until the restart switch signal SS2 is received.

The power management circuit 373 may manage the power of each element of the robot 300. According to embodiments, the power management circuit 373 may determine the power to be supplied to each element of the robot 300, by using the power supplied from the battery 360, and may control the current and the voltage used in each element of the robot 300.

According to embodiments, the power management circuit 373 may monitor the state of the processor 371. For example, the power management circuit 373 may monitor the state of the processor 371, which includes the current, the voltage, or the temperature of the processor 371.

The power management circuit 373 may output a second stop signal STO2 on the basis of the power state of the processor 371. According to embodiments, the power management circuit 373 may compare the power state of the processor 371 to a reference state, and may output the second stop signal STO2 according to a result of comparison. For example, the power management circuit 373 outputs the second stop signal STO2 at the first level (for example, high level) when the current (or voltage) of the processor 371 is lower or higher than a reference current (or reference voltage).

The robot 300 may generate the stop signal by using the processor 371 including the at least two cores and may also generate the additional stop signal by using the power management circuit 373, which monitors the state of the processor 371, thereby performing the stopping of the robot with high reliability.

Figure 6:
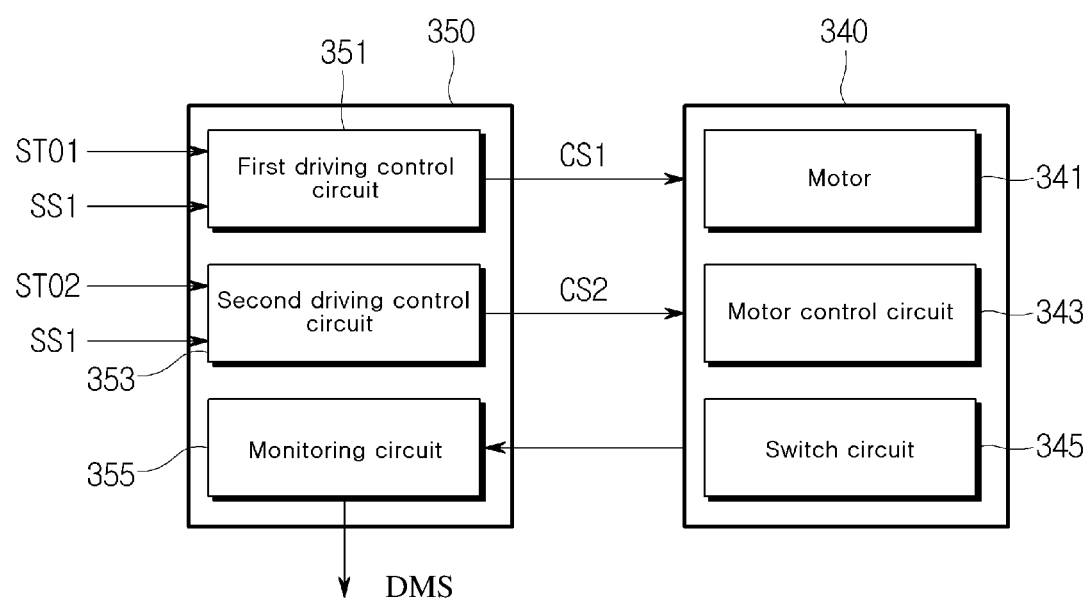
FIG. 6 is a view showing a stop circuit and a driving device according to embodiments of the present disclosure.
Figure 7:
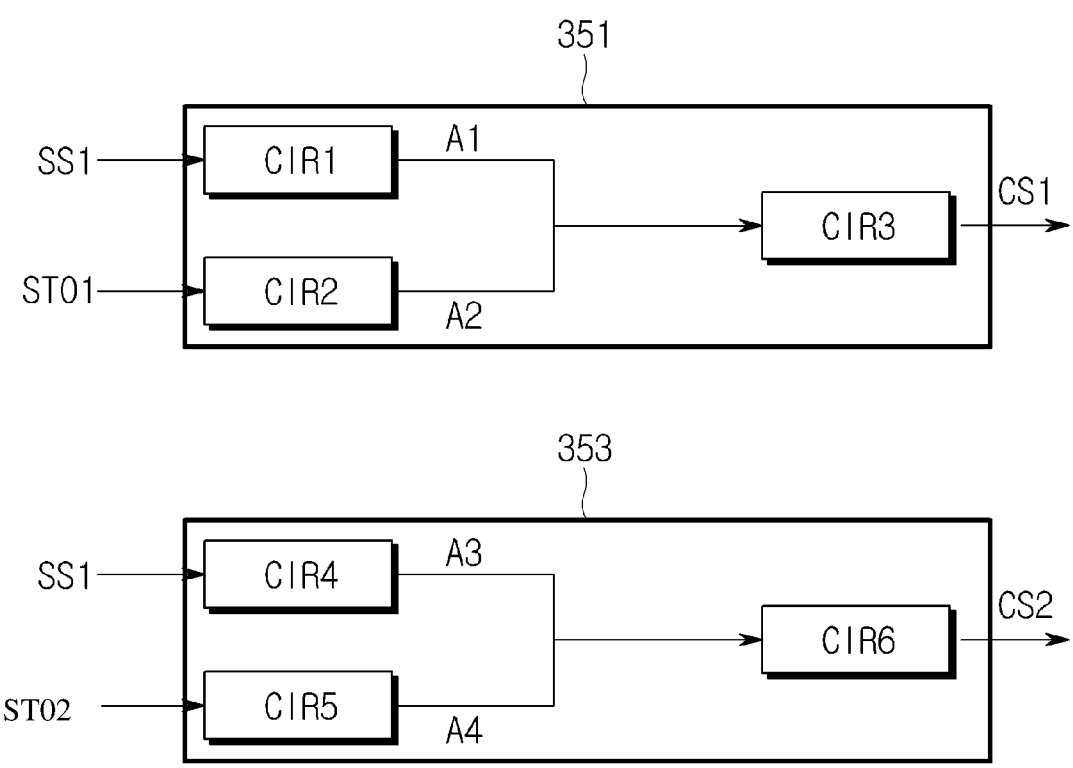
FIG. 7 is a view showing a stop circuit according to embodiments of the present disclosure.

FIG. 6 is a view showing a stop circuit and a driving device according to embodiments of the present disclosure. FIG. 7 is a view showing a stop circuit according to embodiments of the present disclosure. The stop circuit 350 may receive the first stop signal STO1 and the second stop signal STO2, and may stop the operation of the driving device 340, on the basis of the first stop signal STO1 and the second stop signal STO2.

The driving device 340 may generate driving force to move the robot 300, by using a motor 341 and the motor control circuit 343. The motor 341 may generate driving force by using the power (or stored in the battery 360) supplied from the battery 360. According to embodiments, the motor 341 may refer to any device capable of generating driving force, such as an AC motor, a DC motor, a gear motor, a stepper motor, a servo motor, a brush motor, a brushless motor, or the like. For example, the motor 341 may be implemented as a three-phase motor or a brushless direct current (BLDC) motor, but it is not limited thereto. The motor control circuit 343 may output a motor control signal for controlling the motor 341. According to embodiments, the motor control circuit 343 may output, to the motor 341, the motor control signal for controlling the motor 341 according to control by the controller 370. The motor 341 may generate driving force on the basis of the motor control signal.

According to embodiments, the motor control signal generated by the motor control circuit 343 may be a signal for controlling at least one among the size and the direction of the voltage supplied to the motor 341, or may be a signal for controlling at least one among the size and the direction of the current flowing in the motor 341. For example, the motor control circuit 343 may output the motor control signal in the form of a pulse, to the motor 341, and may control the motor 341 by modulating the pulse width of the motor control signal, but it is not limited thereto.

A switch circuit 345 may stop the driving device 340 in response to at least one among a first control signal CS1 and a second control signal CS2. According to embodiments, the switch circuit 345 stops the driving device 340 when the first control signal CS1 is input or when the second control signal CS2 is input. For example, the switch circuit 345 may stop the driving device 340 in response to the first control signal CS1 at the first level (for example, high level) or the second control signal CS2 at the first level.

The switch circuit 345 may stop the driving device 340 by blocking the power supplied to the driving device 340 or by blocking the motor control signal applied from the motor control circuit 343 to the driving device 340.

According to embodiments, the switch circuit 345 may block the power applied to the motor 341 or to the motor control circuit 343, in response to at least one among the first control signal CS1 and the second control signal CS2. For example, the switch circuit 345 may include a first switch circuit configured to receive the power supplied from the battery 360, and a second switch circuit configured to receive the power supplied from the first switch circuit. The first switch circuit may supply or block the power to the second switch circuit, in response to the first control signal CS1. The second switch circuit may supply or block the power to the motor 341 or to the motor control circuit 343, in response to the second control signal CS2. The first switch circuit blocks the power supplied to the second switch circuit, when the first control signal CS1 at the first level (for example, high level) is applied. The second switch circuit blocks the power supplied to the motor 341 or to the motor control circuit 343, when the second control signal CS2 at the first level (for example, high level) is applied.

The first switch circuit and the second switch circuit may include an element, such as a Zener diode, a diode, and a transistor, which is capable of performing a switching function. For example, the first switch circuit and the second switch circuit may be implemented using a field effect transistor (FET).

According to embodiments, the switch circuit 345 may block the motor control signal transmitted from the motor control circuit 343 to the motor 341, in response to at least one among the first control signal CS1 and the second control signal CS2. For example, the switch circuit 345 may include a first switch circuit configured to receive the motor control signal output from the motor control circuit 343, and a second switch circuit configured to receive the motor control signal output from the motor control circuit 343. The first switch circuit may block outputting of the motor control signal to the motor 341, in response to the first control signal CS1. The second switch circuit may block outputting of the motor control signal to the motor 341, in response to the second control signal CS2. The first switch circuit prevents the motor control signal in the form of a pulse from being output to the motor 341, when the first control signal CS1 at the first level (for example, high level) is applied. The second switch circuit prevents the motor control signal in the form of a pulse from being output to the motor 341, when the second control signal CS2 at the first level (for example, high level) is applied.

The first switch circuit and the second switch circuit may include an element, such as a Zener diode, a diode, and a transistor, which is capable of performing a switching function. For example, the first switch circuit and the second switch circuit may be implemented using a bipolar junction transistor (BJT).

The stop circuit 350 may include a first driving control circuit 351, a second driving control circuit 353, and a monitoring circuit 355. The stop circuit 350 may generate the control signals CS1 and CS2 for stopping the operation of the driving device 340, in response to at least one among the first stop signal STO1, the second stop signal STO2, and the stop switch signal SS1.

The first driving control circuit 351 may generate the first control signal CS1 in response to at least one among the first stop signal STO1 and the stop switch signal SS1. According to embodiments, the first driving control circuit 351 generates the first control signal CS1 when the first stop signal STO1 is input or when the stop switch signal SS1 is input. For example, the first driving control circuit 351 may output the first control signal CS1 at the first level to the driving device 340, in response to the first stop signal STO1 at the first level (for example, high level) or the stop switch signal SS1 at the first level.

According to embodiments, as shown in FIG. 7, the first driving control circuit 351 may include the following: a first circuit CIR1 configured to provide a first current A1 in response to the stop switch signal SS1; a second circuit CIR2 configured to provide a second current A2 in response to the first stop signal STO1; and a third circuit CIR3 configured to output the first control signal CS1 on the basis of the first current A1 and the second current A2. The circuits CIR1, CIR2, and CIR3 may include elements, such as a Zener diode, a diode, and a transistor, which are capable of performing a switching function.

The second driving control circuit 353 may generate the second control signal CS2 in response to at least one among the second stop signal STO2 and the stop switch signal SS1. According to embodiments, the second driving control circuit 353 generates the second control signal CS2 when the second stop signal STO2 is input or when the stop switch signal SS1 is input. For example, the second driving control circuit 353 may output the second control signal CS2 at the first level to the driving device 340 in response to the second stop signal STO2 at the first level (for example, high level) or the stop switch signal SS1 at the first level.

As shown in FIG. 7, the second driving control circuit 353 may include the following: a fourth circuit CIR4 configured to provide a third current A3 in response to the stop switch signal SS1; a fifth circuit CIR5 configured to provide a fourth current A4 in response to the second stop signal STO2; and a sixth circuit CIR6 configured to output the second control signal CS2 on the basis of the third current A3 and the fourth current A4. The circuits CIR4, CIR5, and CIR6 may include elements, such as a Zener diode, a diode, and a transistor, which are capable of performing a switching function.

According to embodiments of the present disclosure, the driving control circuits 351 and 353 are capable of outputting the control signals CS1 and CS2 for stopping the driving device 340 even though only at least one among the stop switch signal SS1, the first stop signal STO1, and the second stop signal STO2 is applied. Thus, reliability of the stopping of the robot 300 according to embodiments of the present disclosure is enhanced, and the safety of the user is secured.

In addition, according to embodiments of the present disclosure, the driving device 340 may be stopped even though only at least one among the first control signal CS1 and the second control signal CS2 is applied. Thus, reliability of the stopping of the robot 300 according to embodiments of the present disclosure is enhanced, and the safety of the user is secured.

The monitoring circuit 355 may monitor the state of the driving device 340 and may output a driving monitoring signal DMS. According to embodiments, the monitoring circuit 355 may monitor the voltage applied to the motor 341 or the state (or level) of the motor control signal, and may output the driving monitoring signal DMS according to a result of monitoring. For example, the monitoring circuit 355 may monitor whether the voltage or the motor control circuit is applied to the motor 341 normally.

According to embodiments, the monitoring circuit 355 measures the voltage at a node between the switch circuit 345 and the motor 341. When the voltage applied from the switch circuit 345 to the motor 341 is equal to or greater than a reference voltage, the driving monitoring signal DMS at the first level (for example, high level) is output. When the voltage applied from the switch circuit 345 to the motor 341 is less than the reference voltage, the driving monitoring signal DMS at the second level (for example, low level) is output.

According to embodiments, the monitoring circuit 355 measures the waveform at the node between the switch circuit 345 and the motor 341. When the motor control signal transmitted from the switch circuit 345 to the motor 341 is a pulse waveform, the driving monitoring signal DMS at the first level (for example, high level) is output. When the motor control signal transmitted from the switch circuit 345 to the motor 341 is not a pulse waveform, the driving monitoring signal DMS at the second level (for example, low level) is output.

The processor 371 may receive the monitoring signal DMS. According to embodiments, the processor 371 may output the first stop signal STO1 further on the basis of the monitoring signal DMS.

The processor 371 may control, on the basis of the first stop signal STO1 and the monitoring signal DMS, the power supplied from the battery 360 to the robot 300. The processor 371 may control, by using the power management circuit 373, the power supplied from the battery 360 to the robot 300.

According to embodiments, despite outputting of the first stop signal STO1 for stopping the driving device 340, when the voltage applied to the driving device 340 is equal to or greater than the reference voltage (in other words, when the driving device 340 operates normally), this refers to the fact that the control of the driving device 340 is not performed normally. Thus, the processor 371 may present the power from being supplied from the battery 360 to the robot 300. That is, although the first stop signal STO1 is output, when the voltage applied to the driving device 340 is equal to or greater than the reference voltage, the processor 371 blocks the entire power of the robot 300, thereby powering off the robot 300.

According to embodiments, the processor 371 may block the entire power of the robot 300 on the basis of the level of the first stop signal STO1 and the level of the monitoring signal DMS, thereby powering off the robot 300. In the present disclosure, the processor 371 blocks the entire power of the robot 300 on the basis of the first stop signal STO1 (indicating the stopping of the driving device 340) at the first level (for example, high level) and the driving monitoring signal DMS (indicating that the voltage supplied to the driving device 340 is equal to or greater than the reference voltage) at the first level (for example, high level), thereby powering off the robot 300.

Figure 8:
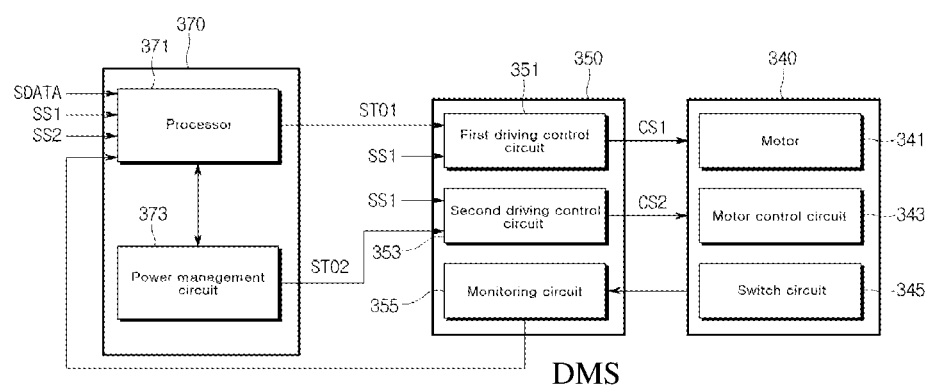
FIG. 8 is a view showing a part of a robot according to embodiments of the present disclosure.
Figure 9:
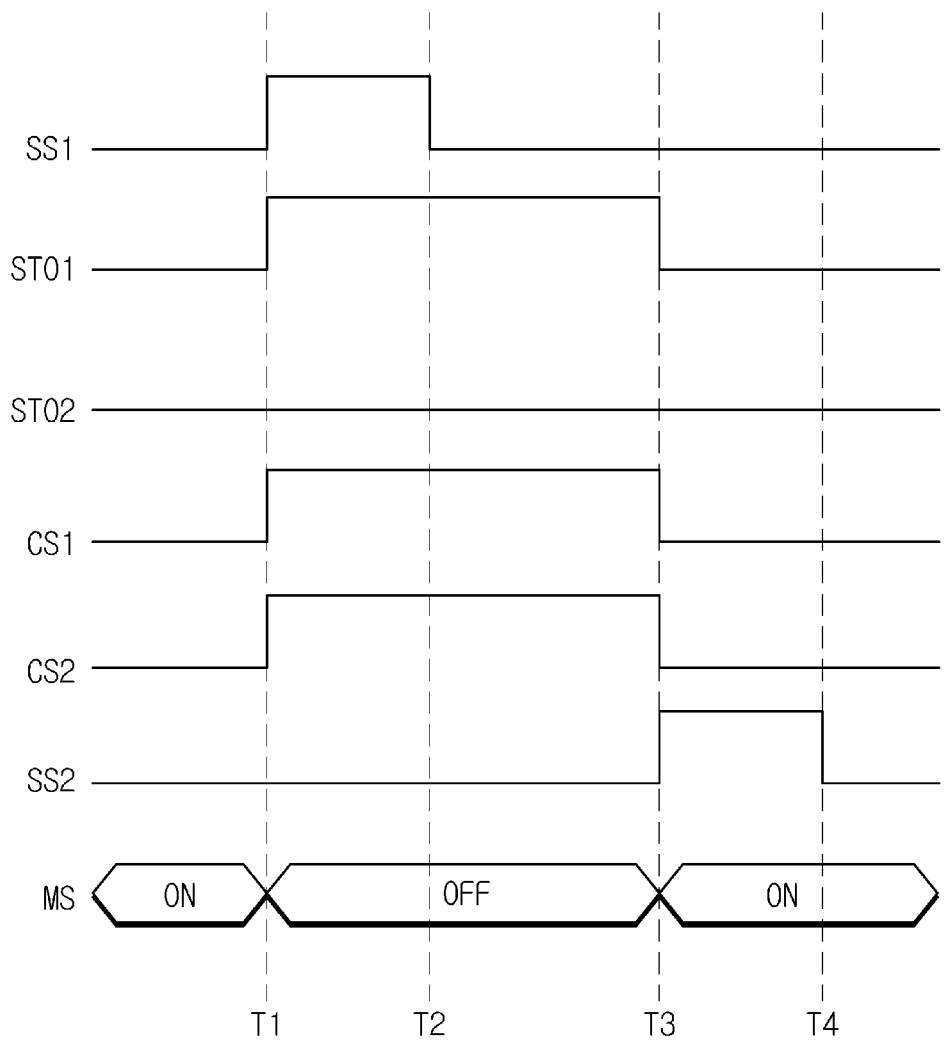
FIG. 9 is a timing diagram according to embodiments of the present disclosure.

FIG. 8 is a view showing a part of a robot according to embodiments of the present disclosure. FIG. 9 is a timing diagram according to embodiments of the present disclosure. With reference to FIGS. 8 and 9, the operations of the robot 300 according to embodiments of the present disclosure will be described.

The driving device 340 operates according to control by the controller 370 (MS=ON). At a first time point T1, the stop switch signal SS1 is output from the stop switch 320. That is, at the first time point T1, the stop switch signal SS1 at the first level (for example, high level) is output. At the first time point T1, the processor 371 may output the first stop signal STO1 in response to the stop switch signal SS1. That is, the processor 371 outputs the first stop signal STO1 at the first level in response to the stop switch signal SS1 at the first level (for example, high level).

At the first time point T1, the driving control circuits 351 and 353 may output the control signals CS1 and CS2 in response to the first stop signal STO1 or the stop switch signal SS1. That is, the driving control circuits 351 and 353 may output the first control signal CS1 and the second control signal CS2 at the first levels in response to the first stop signal STO1 or the stop switch signal SS1 at the first level (for example, high level). The switch circuit 345 may stop the driving device 340 in response to at least one among the first control signal CS1 and the second control signal CS2. According to embodiments, the switch circuit 345 may stop the driving device 340 in response to at least one among the first control signal CS1 and the second control signal CS2. Accordingly, after the first time point T1, the driving device 340 may be stopped (MS=OFF).

After a second time point T2, even though the stop switch signal SS1 is not output from the stop switch 320, the stop switch signal SS1 that has already been output is maintained. According to embodiments, the processor 371 may maintain outputting of the first stop signal STO1 at the first level. Since outputting of the first stop signal STO1 is maintained, outputting of the control signals CS1 and CS2 is also maintained. Accordingly, the stop (MS=OFF) of the driving device 340 may also be maintained.

At a third time point T3, the restart switch signal SS2 is output from the restart switch 330. That is, at the third time point T3, the restart switch signal SS2 at the first level (for example, high level) is output. The processor 371 may stop outputting of the first stop signal STO1 in response to the restart switch signal SS2. According to embodiments, when the first stop signal STO1 at the first level (for example, high level) is output, the processor 371 changes the level of the first stop signal STO1 to the second level (for example, low level) or stops outputting of the first stop signal STO1, in response to the restart switch signal SS2.

At the third time point T3, since the first stop signal STO1 is not output, the driving control circuits 351 and 353 do not output the control signals CS1 and CS2. According to embodiments, the driving control circuits 351 and 353 may change the levels of the control signals CS1 and CS2 to the second level (for example, low level) or may stop outputting of the control signals CS1 and CS2, in response to the first stop signal STO1 at the second level (for example, low level).

Since both the control signals CS1 and CS2 are not output, the switch circuit 345 restarts the stopped driving device 340. According to embodiments, when both the first control signal CS1 and the second control signal CS2 are at the second level (for example, low level), the switch circuit 345 restarts the stopped driving device 340. Accordingly, after the third time point T3, the driving device 340 may be restarted (MS=ON).

After the third time point T3, even though the restart switch signal SS2 is not output from the restart switch 330, the processor 371 does not output the first stop signal STO1. As described above, the processor 371 does not output the first stop signal STO1 until the stop switch signal SS1 output by the stop switch 320 is received.

The timing diagram of FIG. 9 shows the case in which the first stop signal STO1 is output in response to the stop switch signal SS1, for example. However, the operation of the robot 300 in the case in which the second stop signal STO2 is output in response to the stop switch signal SS1 may also be understood to be similar.

Figure 10:
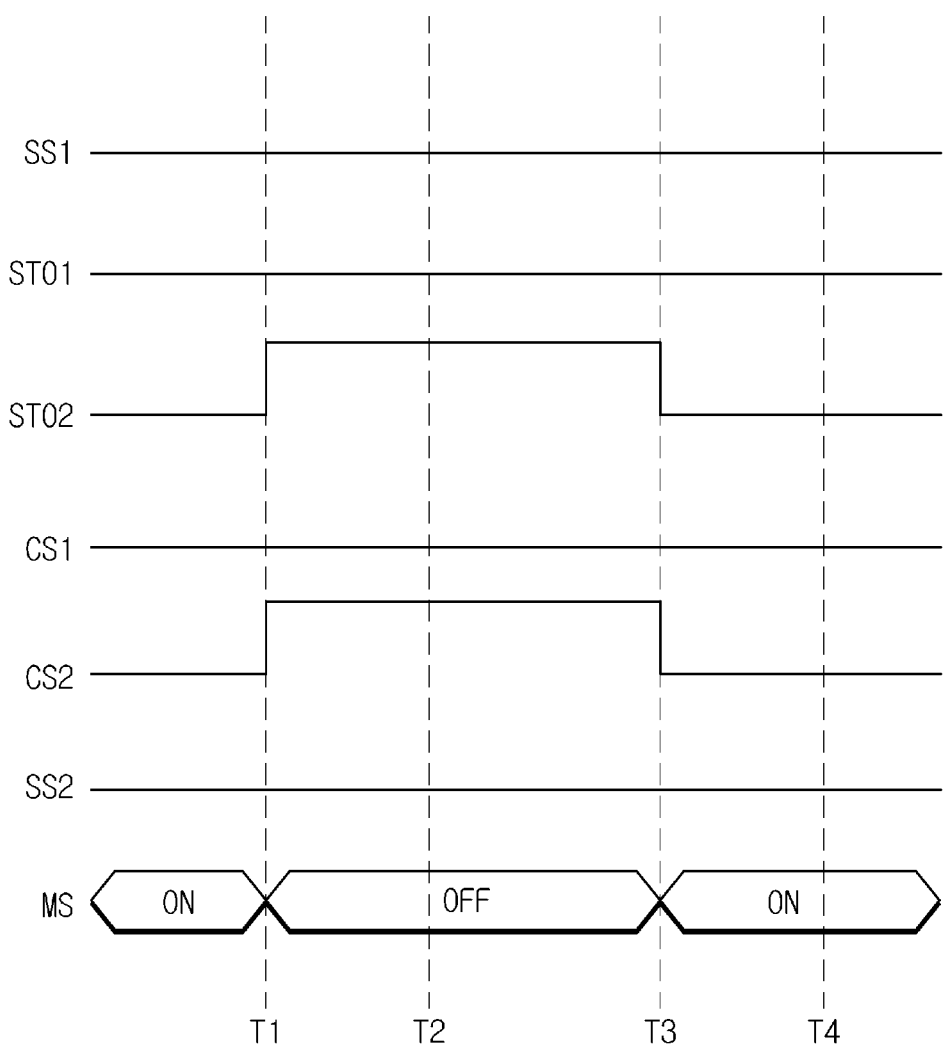
FIG. 10 is a timing diagram according to embodiments of the present disclosure.

FIG. 10 is a timing diagram according to embodiments of the present disclosure. Referring to FIGS. 8 to 10, the driving device 340 operates according to control by the controller 370 (MS=ON).

At the first time point T1, the power management circuit 373 may output the second stop signal STO2 on the basis of the power state of the processor 371. According to embodiments, the power management circuit 373 outputs the second stop signal STO2 at the first level, when the power state of the processor 371 does not reach the reference state. The power management circuit 373 may output the second stop signal STO2 on the basis of the power state of the processor 371, regardless of outputting of the stop switch signal SS1.

At the first time point T1, the second driving control circuit 353 may output the control signals CS1 and CS2 in response to the second stop signal STO2. That is, the second driving control circuit 353 may output the second control signal CS2 at the first level in response to the second stop signal STO2 at the first level (for example, high level). The switch circuit 345 may stop the driving device 340 in response to the second control signal CS2. Accordingly, after the first time point T1, the driving device 340 may be stopped (MS=OFF).

The power management circuit 373 may keep outputting the second stop signal STO2 while the power state of the processor 371 does not reach the reference state. Accordingly, outputting of the second control signal CS2 may be maintained, and the driving device 340 may keep being stopped (MS=OFF).

At the third time point T3, when the power state of the processor 371 is recovered, in other words, when the power state of the processor 371 reaches the reference state, the power management circuit 373 stops outputting of the second stop signal STO2. According to embodiments, the power management circuit 373 may change the level of the second stop signal STO2 to the second level (for example, low level) or may stop outputting of the second stop signal STO2.

At the third time point T3, since the second stop signal STO2 is not output, the second driving control circuit 353 does not output the second control signal CS2. According to embodiments, the second driving control circuit 353 may change the level of the second control signal CS2 to the second level (for example, low level) or may stop outputting of the second control signal CS2. Since both the control signals CS1 and CS2 are not output, the switch circuit 345 restarts the stopped driving device 340. Accordingly, after the third time point T3, the driving device 340 may be restarted (MS=ON).

Accordingly, the stop circuit 350 according to embodiments of the present disclosure may output the control signal for stopping the driving device 340, on the basis of the power state of the processor 371, thereby enhancing safety and reliability of the robot 300.

The control method of the robot or operation method of the processor according to embodiments of the present disclosure may be stored in a computer readable storage medium so as to be employed in commands executable by the processor. The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Accordingly, the present disclosure has been made keeping in mind the above problems occurring in the related art, and the present disclosure is intended to provide a robot capable of performing emergency stopping.

According to embodiments of the present disclosure, there is provided a robot capable of performing emergency stopping, the robot including: a driving device configured to perform movement of the robot; a stop switch configured to output a stop switch signal; a controller configured to output a stop signal; and a stop circuit configured to output a first control signal and a second control signal for stopping the driving device, wherein the stop circuit outputs the first control signal and the second control signal in response to the stop signal and the stop switch signal.

According to embodiments of the present disclosure, there is provided a stop control circuit for performing emergency stopping of a robot, the stop control circuit including: a processor configured to output a first stop signal on the basis of a stop switch signal; a power management circuit configured to monitor a state of the processor, and output a second stop signal according to the state of the processor; and a stop circuit configured to output a first control signal and a second control signal for stopping a driving device of the robot, in response to at least one among the stop switch signal, the first stop signal, and the second stop signal.

According to embodiments of the present disclosure, the stopping of the robot is performed, considering the output of the stop switch and further considering the result of detection by the sensor, and the state of the robot, thereby enhancing the stability of the robot.

According to embodiments of the present disclosure, when an emergency situation occurs, the driving device of the robot is automatically stopped and further, the entire robot is stopped.

According to embodiments of the present disclosure, the emergency stopping of the robot is performed on the basis of various signals, thereby stably performing the emergency stopping in an emergency situation.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot capable of movement, the robot comprising:
a sensor configured to detect an object outside of the robot;
a driving device configured to provide power for movement of the robot;
a stop switch configured to provide a stop switch signal in response to a user input;
a controller configured to control operations of the robot, and to provide a first stop signal and a second stop signal; and
a stop circuit configured to provide, to the driving device, at least one of a first control signal or a second control signal for stopping the movement of the robot, in response to receive at least one of the first stop signal, the second stop signal, or the stop switch signal,
wherein the controller comprises:
a processor configured to provide the first stop signal to the stop circuit when the object is determined to be within a specific region with respect to the robot; and
a power management circuit configured to monitor a state of the processor, and to provide the second stop signal to the stop circuit based on the monitored state of the processor.

2. The robot of claim 1, wherein the processor includes a first core, a second core, and a core controller to control the first core and the second core, and
the core controller is configured to:
activate the first core such that the first core is to provide the first stop signal to the stop circuit;
deactivate the first core; and
activate the second core such that the second core is to provide the first stop signal to the stop circuit.

3. The robot of claim 1, wherein the stop circuit includes:
a first driving control circuit configured to provide the first control signal based on the stop switch signal and the first stop signal; and
a second driving control circuit configured to provide the second control signal based on the stop switch signal and the second stop signal.

4. The robot of claim 3, wherein the driving device includes:
a motor configured to provide a driving force;
a motor control circuit configured to provide a motor control signal for controlling the motor; and
a switch circuit configured to stop the driving device in response to the first control signal or the second control signal.

5. The robot of claim 4, wherein in response to the driving device receiving the first control signal or the second control signal, the switch circuit is to block power to the motor or to block the motor control signal.

6. The robot of claim 4, wherein the stop circuit includes a monitoring circuit configured to:
monitor power applied to the motor or a state of the motor control signal, and
provide a driving monitoring signal based on a result of the monitored power or the monitored state; and
the controller is configured to power off the robot based on the first stop signal, and the driving monitoring signal.

7. The robot of claim 1, further comprising:
a restart switch configured to output a restart switch signal in response to a user input,
wherein the processor is to receive the restart switch signal, and in response to receiving the restart switch signal, the processor is to control the stop circuit such that the driving device is to be restarted.

8. The robot of claim 7, wherein the controller is configured to:
output the first stop signal while the stop switch signal is inputted;
maintain outputting of the first stop signal until the restart switch signal is inputted; and
stop outputting of the stop signal, when the restart switch signal is inputted, and
wherein the stop circuit is configured to:
provide the first control signal and the second control signal for stopping the driving device, while the first stop signal is inputted; and
stop, when the first stop signal is not inputted, outputting of the first control signal and the second control signal so that the driving device is to be restarted.

9. A stop control apparatus for stopping movement of a robot, the stop control apparatus comprising:
a processor configured to provide a first stop signal when an object detected by a sensor is determined to be within a specific region with respect to the robot;
a power management circuit configured to monitor a state of the processor, and to provide a second stop signal according to the monitored state of the processor; and
a stop circuit configured to:
receive at least one of the first stop signal, the second stop signal, or a stop switch signal provided by a stop switch based on a user input, and
provide a first control signal or a second control signal for stopping a driving device of the robot, in response to the received at least one of the stop switch signal, the first stop signal, or the second stop signal.

10. The stop control apparatus of claim 9, wherein the processor includes a first core, a second core, and a core controller to control the first core and the second core, and
the core controller is configured to:
activate the first core such that the first core is to provide the first stop signal;
deactivate the first core; and
activate the second core such that the second core is to provide the first stop signal.

11. The stop control apparatus of claim 9, wherein the stop circuit includes:
   a first driving control circuit configured to provide the first control signal based on the stop switch signal or the first stop signal; and
   a second driving control circuit configured to provide the second control signal based on the stop switch signal or the second stop signal.

12. The stop control apparatus of claim 9, wherein the stop circuit includes a monitoring circuit configured to:
   monitor power applied to the driving device or a state of a motor control signal, and
   provide a driving monitoring signal based on the monitored power or the monitored state, and
   the processor is configured to power off the robot based on the first stop signal and the driving monitoring signal.

13. The stop control apparatus of claim 9, wherein the processor is to receive a restart switch signal in response to a user input, and
   in response to receiving the restart switch signal, the processor is to control the stop circuit such that the driving device is to be restarted.

14. The stop control apparatus of claim 13, wherein the processor is configured to:
   provide the first stop signal while the stop switch signal is inputted,
   providing of the first stop signal until the restart switch signal is received, and
   stop providing of the first stop signal when the restart switch signal is received, and
   wherein the stop circuit is configured to:
      provide the first control signal and the second control signal for stopping the driving device, while the first stop signal is provided; and
      stop, when the first stop signal is not inputted, providing of the first control signal and the second control signal such that the driving device is to be restarted.

15. A system for stopping movement of a robot, the system comprising:
   a driving device configured to provide power for movement of the robot;
   an input device to receive a user input, and to provide a first switch signal; and
   a stop control apparatus configured to:
   provide a first stop signal when an object detected by a sensor is determined to be within a specific region with respect to the robot,
   provide a second stop signal based on a state of a component of the stop control apparatus,
   provide a first control signal to the driving device based on the first stop signal and the first switch signal or a second control signal to the driving device based on the second stop signal and the first switch signal,
   wherein the driving device is to stop movement of the robot based on the received first control signal or the received second control signal.

16. The system of claim 15, wherein the driving device includes:
   a motor configured to provide a driving force;
   a motor control circuit configured to provide a motor control signal for controlling the motor; and
   a switch circuit configured to stop the driving device in response to the first control signal or the second control signal.

17. The system of claim 16, wherein the stop control apparatus includes a monitoring circuit configured to:
   monitor power applied to the motor or a state of the motor control signal, and
   provide a driving monitoring signal based on a result of the monitored power or the monitored state; and
   the stop control apparatus is configured to power off the robot based on the first stop signal and the driving monitoring signal.

* * * * *